April 26, 1966
W. W. COCHRAN   3,247,951
UNLOADING AND SWEEPING MACHINE
Filed April 21, 1964
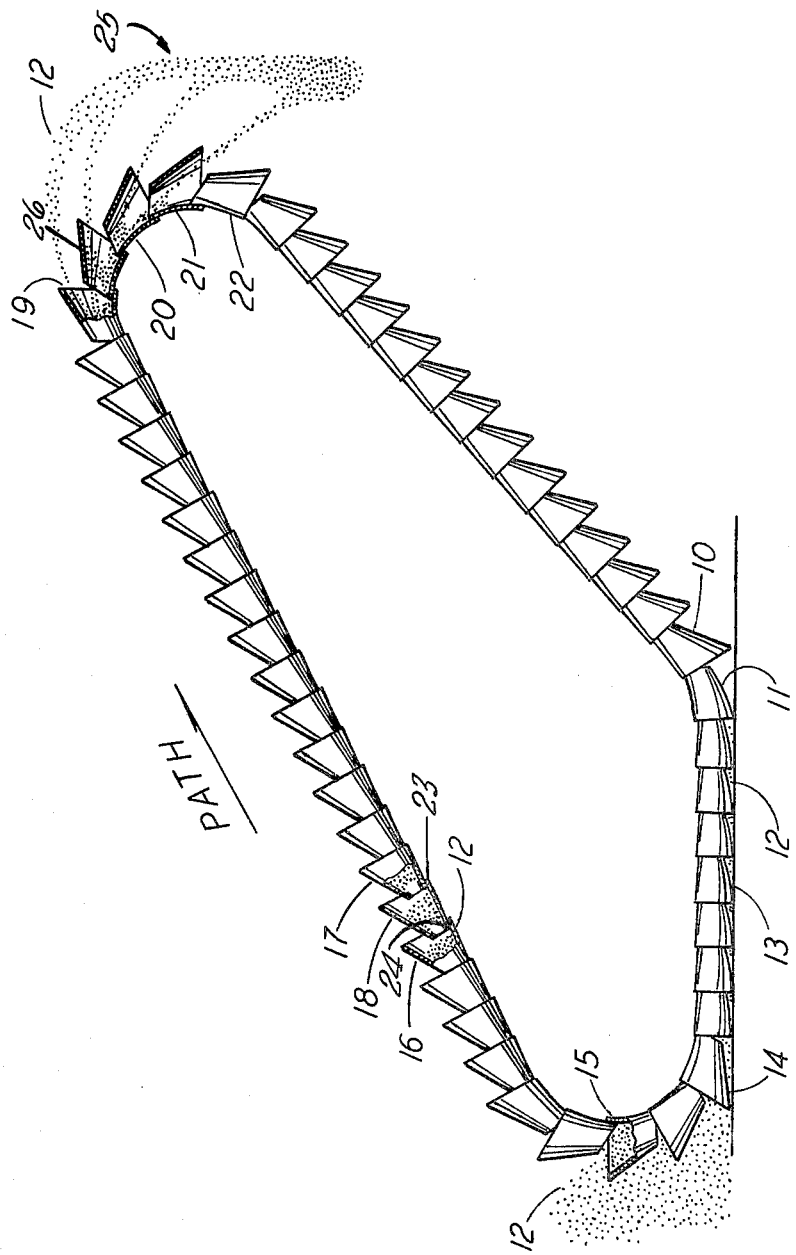
William W Cochran   INVENTOR.

United States Patent Office 3,247,951
Patented Apr. 26, 1966

3,247,951
UNLOADING AND SWEEPING MACHINE
William W. Cochran, 1460 W. Forest, Decatur, Ill.
Filed Apr. 21, 1964, Ser. No. 361,453
2 Claims. (Cl. 198—140)

This invention relates to a new machine for unloading and sweeping floors of ships, barges, flat storage bins and the like when such facilities have been filled with materials such as grain, cement, flour or other loose granular materials.

Heretofore such materials have been handled by men equipped with power shovels and other slow and laborious devices.

Aside from the laborious expensive means now used, much valuable material is being wasted simply for the reason that it cannot economically be reclaimed.

The object of this invention concerns the use of novel interfitted cup members such as cone-shaped cups endlessly connected around a continuous circuit, mechanically propelled machine, to convey and sweep materials being handled from the pile or floor, thus eliminating misuse of man power.

It is a further object of this invention to provide an endless conveyor means which will be more efficient in picking up loose granular material from flat storage, a pile or the like, and which will provide a good discharge pattern.

Further and fuller objects will become readily apparent when reference is made to the accompanying drawing wherein:

The single figure in the drawing is a side view partially in section showing the sweeping machine in a typical position of operation.

In the accompanying drawing, reference character 10 indicates an empty cup-shaped conveyor member returning from the discharge area 25 to the pick-up or filling area. The cup member 10 is formed of any suitable flexible and resilient material such as cloth-reinforced elastomeric or plastomeric materials of known form. As the resilient cup member reaches the storage surface at the position indicated at 11, it is flattened at or distorted along the outer side to conform to the shape of the surface engaged, which in the present case is illustrated as a planar floor. When frusto-conical cup members are utilized, the leading edge of each cup member is widened along the surface contacting the floor as it initiates the sweeping or pick-up function. Filling of the cup member will occur and continue as the cup member progresses to the positions indicated at 13 and 14 with a small portion of the material being forced through the open bottom of the cup member into the next adjacent cup member. At 15, filling is nearly complete with the trailing cup member being nearly filled also. This prevents the granular material from draining from the preceding cup through the bottom opening into the trailing cup.

The co-action between filled cups is best represented in the drawings by the broken away portions of the cup members indicated at 16, 17 and 18. The cup members are of uniform design having an opening 23 at the leading end and an opening of reduced cross sectional size 24 at the trailing end. The opening at the trailing end is positioned within the opening in the leading end of the trailing cup with the cups being fastened to each by any suitable means such as a bolt, rivet or the like.

The cups continue their travel up the incline with the material in one cup preventing the material in the next cup from draining from the bottom opening. When the cups reach the discharge area 25, the discharge pattern approximates that representee by the solid dots in the drawings. Cup member 19 is commencing discharge of the granular material 12 while cups 20 and 26 are in the final stage of completing the material discharge. A hopper, truck or conveyor of known form can carry the material from the discharge area 25.

As is evident in the drawing, each cup will discharge around and through the preceding cup. For example, cup 26 is illustrated as discharging partially through cup 20 as well as around the outer circumference. Cup 20 is discharging not only around cup 21 but partially through the same. In this manner, each cup member will be completely emptied for greatest efficiency.

The resilience of the individual cups, coupled with the open end design of the cup and discharge pattern precludes material sticking in the cup inasmuch as the material discharged from the following cup will have a tendency to assist in freeing any material lodged in the preceding cup. The flexing of the cups in the discharge area caused by the reversal of the direction of travel also assists in effecting a complete discharge.

It is contemplated that suitable means to fix the path of travel may be as shown, or other arrangements may be adapted, all obviously within the skill of the design engineer. It is to be appreciated that the interfitted cup members on the conveyor of the present invention will be more efficient when considering the conveyor speed since more cup members are present per unit length than in prior art designs having closed bottoms. Thus, the present conveyor running at the same linear rate is capable of handling more material. Uniformity of construction of the cup members contributes to economical manufacture of the endless conveyor.

The preceding description is to be regarded as illustrative, and not descriptive, of the invention, of which modifications can be made without departing from the spirit and scope of the invention as denoted by the appended claims.

The invention having been described, what is claimed as new is:

1. An endless conveyor particularly adapted for use in picking up granular materials from flat storage or the like, said endless conveyor comprising a series of flexible cup members joined together to form an endless conveyor, each of said cup members having a leading end and a trailing end, an opening at the leading end adapted to scoop up granular materials from a surface, an open bottom at the trailing end of each of said cup members, said open bottom of said one cup member being disposed within the opening of the leading end of the following cup member whereby one cup member can fill and discharge through the adjacent cup member, and the following cup member when filled will close off the opening of the bottom of the preceding cup member, and said open bottom being of reduced cross sectional area relative to the opening at the leading end whereby trailing cups may also discharge around the preceding cup.

2. The endless conveyor of claim 1 wherein each of said cup-shaped members is of generally frusto-conical configuration.

References Cited by the Examiner

UNITED STATES PATENTS

| | | | |
|---|---|---|---|
| 629,250 | 7/1899 | Henretty | 198—152 |
| 640,762 | 1/1900 | Gray | 198—152 |
| 2,570,143 | 10/1951 | Merrick | 198—131 |
| 2,984,334 | 5/1961 | Dungfelder | 198—131 |

FOREIGN PATENTS 648,969   6/1958   Canada.

HUGO O. SCULTZ, Primary Examiner.
RICHARD E. AEGERTER, SAMUEL F. COLEMAN, Examiners.